C. W. TAYLOR.
POWER TRANSMISSION MECHANISM.
APPLICATION FILED APR. 24, 1911.
1,025,331.
Patented May 7, 1912.
2 SHEETS—SHEET 1.
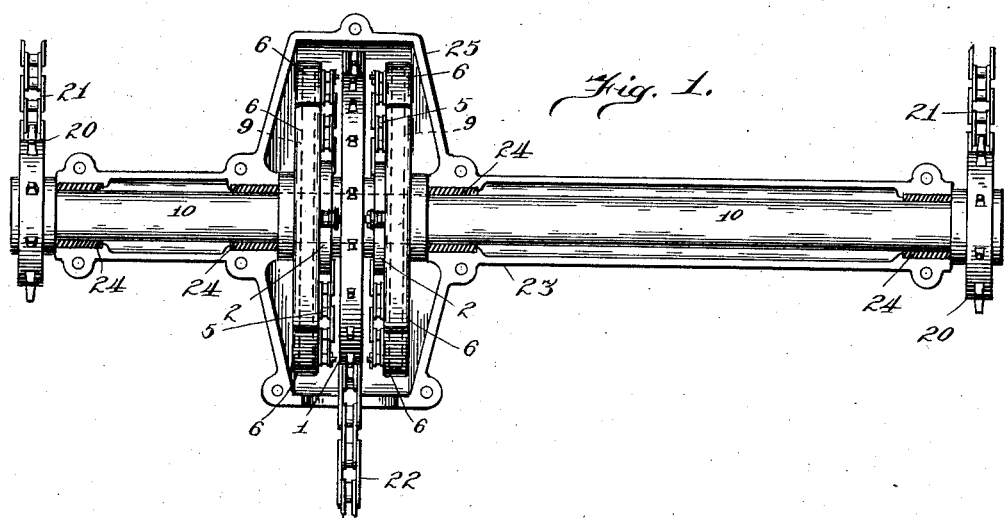
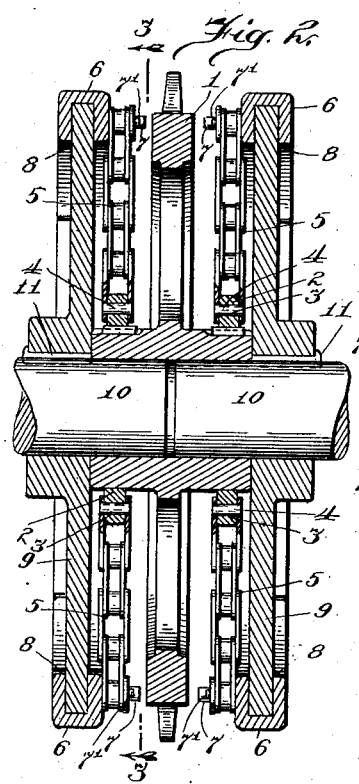
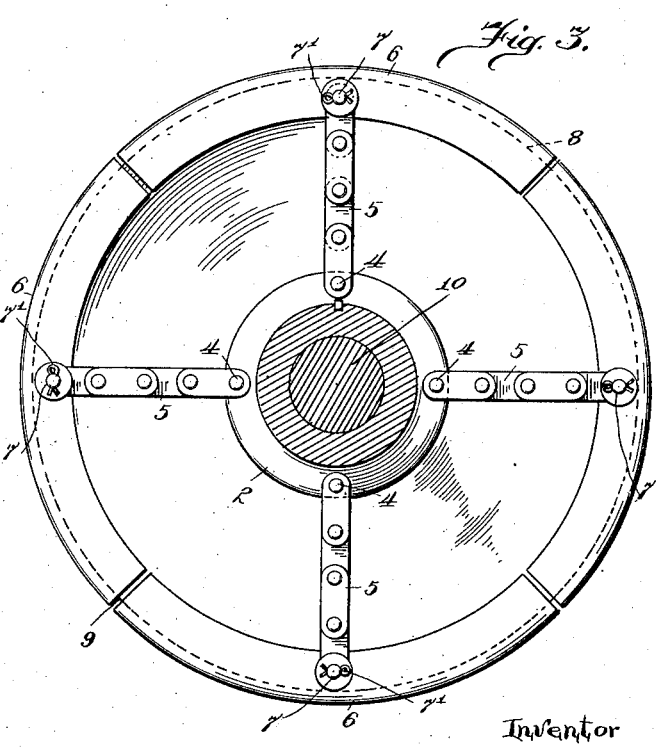
Witnesses
Milton Lenoir
E. Richard Betts
Inventor
Clarence W Taylor

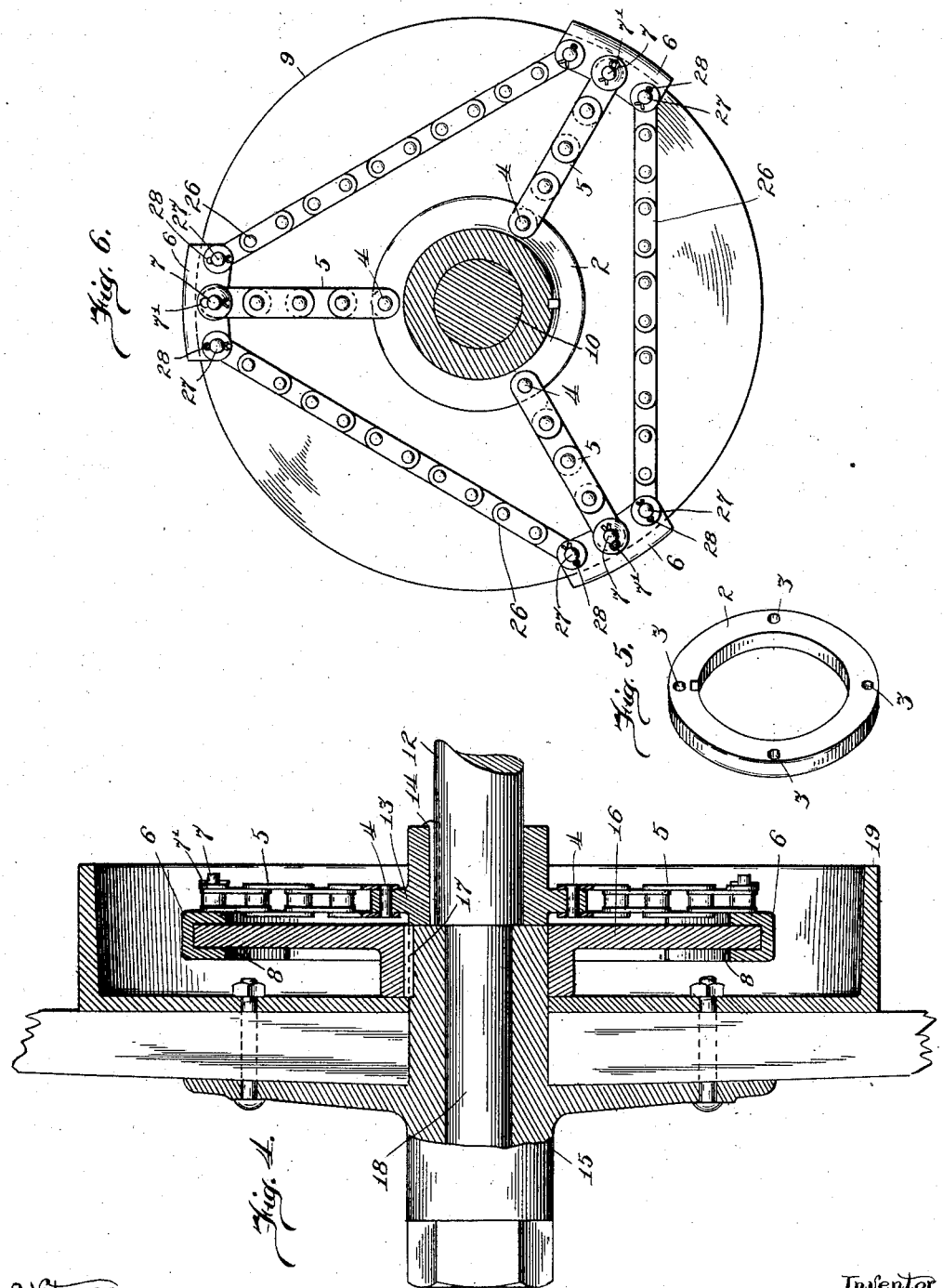

UNITED STATES PATENT OFFICE.

CLARENCE W. TAYLOR, OF CHICAGO, ILLINOIS.

POWER-TRANSMISSION MECHANISM.

1,025,331.  Specification of Letters Patent.  Patented May 7, 1912.

Application filed April 24, 1911. Serial No. 622,995.

*To all whom it may concern:*

Be it known that I, CLARENCE W. TAYLOR, a citizen of the United States, residing at Chicago, in the county of Cook and State of Illinois, have invented certain new and useful Improvements in Power-Transmission Mechanism, of which the following is a specification.

My invention relates to improvements in power transmission mechanism, and the objects of my improvement are, first to provide a construction whereby to actuate a driven member in either direction and to permit the driven member to independently revolve faster than the driving member in either direction; second, the provision of clutch mechanism, simple, strong and durable, between the driving and the driven parts in machines of any type in which it is desirable to have automatic release and independent movement of the driven part in either direction; third, to afford a construction adapted to occupy limited space, and to be of sufficient strength to give a long term of usefulness.

With the above and other objects in view, my invention consists in the novel features and in the novel combination and arrangement of parts hereinafter fully described, illustrated in the accompanying drawings forming a part of this specification, and particularly pointed out in the claims hereunto appended, it being understood that changes, variations and modifications in the details of the invention within the scope of the claims, may be resorted to without departing from the spirit or sacrificing any of the advantages thereof.

Figure 1 is a longitudinal section of a counter shaft employed in double chain drive self propelled vehicle. Fig. 2 is an enlarged sectional view of the parts of a power transmission mechanism as applied to a divided counter-shaft in double chain driven cars. Fig. 3 is a vertical section on line 3—3 of Fig. 2. Fig. 4 is a longitudinal section of a part of a rear axle and a traction wheel with the driven member fixed to the wheel. Fig. 5 is a perspective view of the aperture of collar to which is pivoted the radial connectors. Fig. 6 is a side elevation of a somewhat modified form of the transmission means.

Similar numerals refer to similar parts throughout the several views.

Referring to the drawings by reference numerals, 1 designates what is termed a driving member having a collar 2, fixed thereto with apertures 3, through the collar to receive the pivot 4, for engagement with one end of each draw-connector 5, which preferably are flexible, being made of automobile chain links. At the outer ends of the draw-connectors are pivotally attached what is termed clutch-shoes, 6, by means of studs 7, integral with or attached to the respective shoes, and which project through the end link, and are held in place by cotter pin 7'.

The construction of the shoes shown in Figs. 1, 2 and 3, is such that the four nearly or quite form a circle. Any number of shoes desired may be employed. Each shoe has a groove or recess 8 which is adapted to receive driven member 9. The member 9 preferably is a solid disk suitably fixed to the shaft 10, by key 11. (See Figs. 1 and 2).

The rear axle 12 (see Fig. 4) has a collar 13, keyed to the axle at 14. The hub 15, of the wheel has secured to it the driven member 16, by key 17. The wheel is loosely journaled on the reduced portion 18, of the axle 12.

The reference numeral 19, denotes the brake flange.

The shaft 10, has secured to its outer end a sprocket wheel 20. The sprocket chain 21, leads to a companion sprocket wheel (not shown).

The driving member 1, may be a bevel gear or other preferred means for receiving power.

The construction disclosed in Fig. 1 is suitable for a counter-shaft with my differential means in double chain drive automobiles.

The sprocket chain 22, leads to a small sprocket wheel (not shown) on the crank shaft (not shown) of the motor (not shown).

23 designates a casing and 24 indicates bearings for the respective shafts, 10. The portion 25, affords a housing for the differential mechanism.

In Fig. 6 is shown a form of power transmission somewhat modified in that the clutch shoes are shorter and fewer in number, and that the segmentally positioned connectors, 26, are connected to the shoes by means of the studs 27, which are integral with or attached to the shoes. The chains 26, perform the function of preventing one of the shoes sliding with respect to another when power is applied to the driving member, and they insure synchronous movement of the clutching ends of the draw-connectors. The sliding of one shoe will instantly tighten the shoe just behind it, and thus increase the certainty of complete frictional adherence of the shoe to the perimeter of the driven member.

In use and operation it will readily be understood that when the collar 2, is caused to rotate in either direction, the draw-connectors will be tightened and draw the respective clutch shoes into power transmitting engagement with the periphery of the driven member which will instantly rotate with the shoes. The draw-connectors being normally taut and pivotally attached to both the collar and the shoes, only a slight rotation of the collar is required for complete engagement of the shoes with the driven member, and vice versa, only a slight rotation of the driven member faster than the driving member is necessary to effect a release of the driven member so that in the case of an automobile, for example, it is free to rotate independently of the source of power.

The draw-connectors preferably are made flexible and of great strength. I am aware that for some purposes the draw-connectors and their contacting ends may be made of one solid piece, and a hook formed on the outer end for engagement with the driven member, and pivoted to the collar, and segmental chains employed to maintain the connectors a fairly uniform distance apart without departing from the spirit of my invention. Therefore, I do not desire to be limited to the exact construction shown and described of the preferred embodiment of the draw-connectors and their clutching outer ends.

The clutch-shoes shown in Figs. 1, 2, 3 and 4, are of sufficient length to permit slight radial movement when power is applied to the draw-connectors. These shoes or clutches cannot have enough longitudinal movement with respect to each other for any one of them to drop down or more than slightly approach each other when the driving member stops rotating.

Normally, the shoes are in sliding contact with the periphery or perimeter of the driven member, and are adapted to be forced into frictional adherence instantly upon the application of power.

Having thus fully described my invention, what I claim as new, and desire to secure by Letters-Patent, is:

1. In power transmission mechanism, a driving member and a driven member, a plurality of clutch-shoes normally in sliding contact and adapted to engage with the perimeter of the driven member, and a draw-connector in operative engagement at one end with each clutch-shoe and at the other end with the driving member, to actuate the driven member in either direction and to permit the driven member to independently revolve faster than the driving member in either direction.

2. In power transmission mechanism, the combination of a driving member and a driven member, a plurality of clutch-shoes substantially encircling and adapted to engage with the perimeter of the driven member, and a flexible draw-connector in pivoted engagement with each clutch-shoe and the driving member, to actuate the driven member in either direction and to permit the driven member to independently revolve faster than the driving member in either direction.

3. In power transmission mechanism independent shafts, a driving member rotatable independently of the shafts, a driven member fixed to each shaft a plurality of draw-connectors with one end normally in sliding engagement therewith and its opposite end in operative engagement with the driving member, to actuate the driven members in either direction and to permit the driven members to independently revolve faster than the driving member in either direction.

4. In power transmission mechanism, the combination of a rotatable driving shaft, a collar fixed thereto, a driven member, a plurality of clutch shoes normally in sliding contact and adapted to engage with the perimeter of the driven member, and a draw-connector in operative engagement at one end with each clutch shoe and at the other end with the driving member, to actuate the driven member in either direction, and to permit the driven member to independently revolve faster than the driving member in either direction.

5. In power transmission mechanism, a driving member and a driven member, a plurality of draw-connectors each having one end in operative engagement with the driving member, and its opposite end disposed and adapted to engage with the perimeter of the driven member, and segmental connectors securing the draw-connectors together to facilitate synchronous movement of the clutching ends of the draw-connectors.

In testimony whereof, I affix my signature in the presence of two witnesses.

CLARENCE W. TAYLOR. [L. S.]

Witnesses:
C. RICHARD BETTS,
H. A. MOSHER.